Jan. 29, 1935.  A. T. SHEPHERD  1,989,340
APPARATUS FOR RECOVERING HEAT FROM WASTE WATER
Filed Oct. 18, 1932   5 Sheets-Sheet 1

Inventor
Allan T. Shepherd
By S. H. Evans
Attorney

Jan. 29, 1935. A. T. SHEPHERD 1,989,340
APPARATUS FOR RECOVERING HEAT FROM WASTE WATER
Filed Oct. 18, 1932 5 Sheets-Sheet 2

Inventor
Allan T. Shepherd
By S. H. Evans
Attorney

Jan. 29, 1935.  A. T. SHEPHERD  1,989,340
APPARATUS FOR RECOVERING HEAT FROM WASTE WATER
Filed Oct. 18, 1932   5 Sheets-Sheet 3

Inventor
Allan T. Shepherd
By S. H. Evans
Attorney

Jan. 29, 1935. A. T. SHEPHERD 1,989,340
APPARATUS FOR RECOVERING HEAT FROM WASTE WATER
Filed Oct. 18, 1932 5 Sheets-Sheet 4
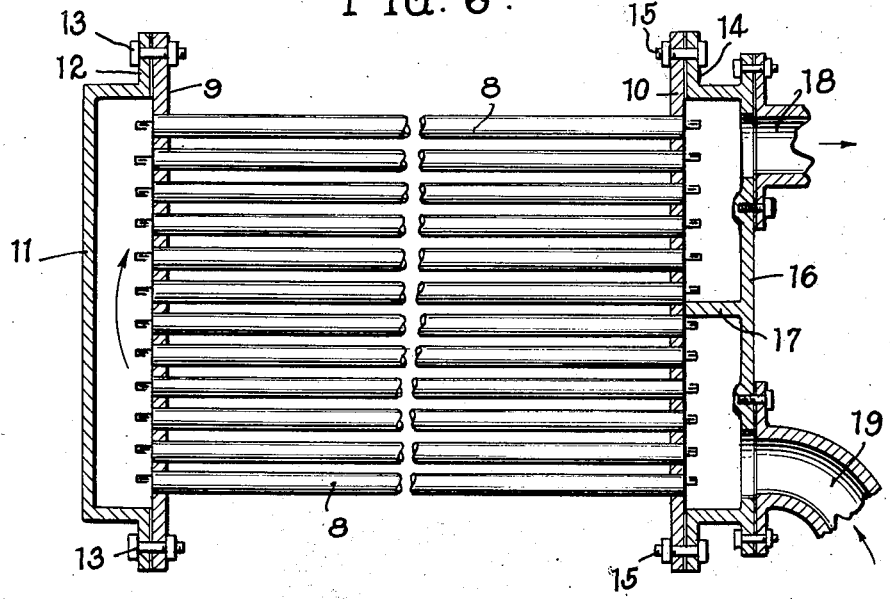
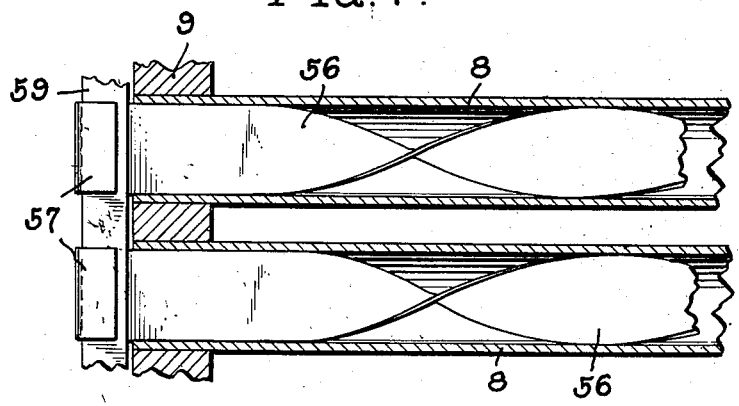
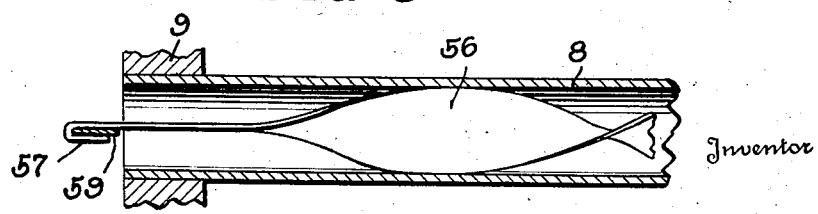

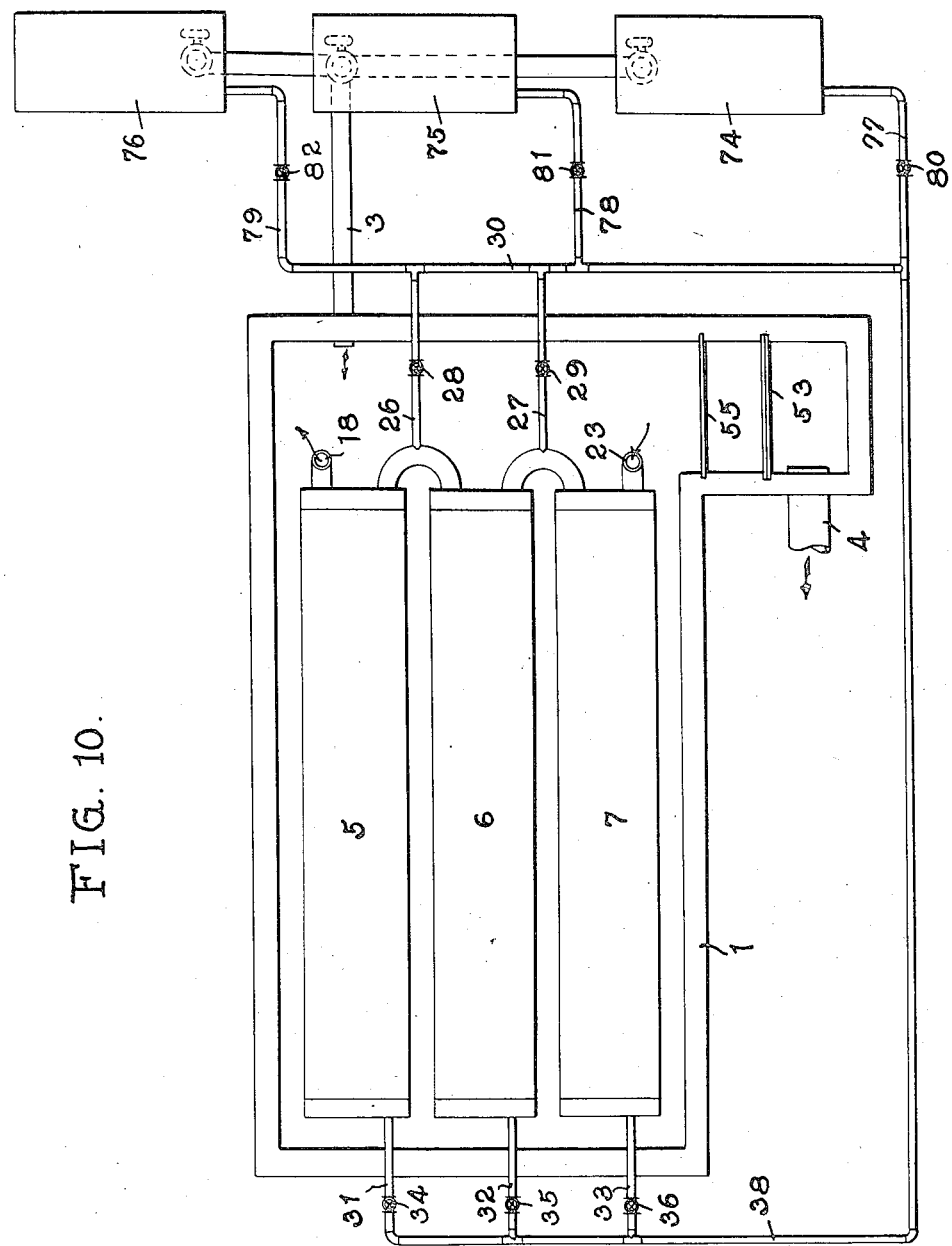

Patented Jan. 29, 1935

1,989,340

UNITED STATES PATENT OFFICE 1,989,340

APPARATUS FOR RECOVERING HEAT FROM WASTE WATER

Allan T. Shepherd, Richmond, Va.

Application October 18, 1932, Serial No. 638,405

3 Claims. (Cl. 257—198)

My invention relates to improvements in apparatus for recovering heat from waste water.

Said invention pertains more particularly to utilizing waste hot water from laundries for heating the supply of cold fresh water used in laundries whereby the greatest amount of heat can be obtained from the waste water for heating the cold fresh water and thus causing a great saving in the operation of the laundry.

One object of my invention is to provide an apparatus of this character in which the waste water is caused to circulate between and longitudinally of the tubes containing the cold fresh water and at the same time provide means whereby the tubes can be readily cleaned of the deposit of grease, lint or other waste matter which is found in waste water from laundries.

Another object of my invention is to provide an apparatus of this character in which the fresh water enters the tubes at a point where the waste water is the coolest and gradually travels through the tubes in a body of waste water traveling in an opposite direction to the fresh water and greatly increasing in heat until it is discharged at a point where the waste water is at the highest temperature.

Another object of my invention is to provide an apparatus of this character in which the fresh water can be readily drawn off from the tubes at different points so that water of different temperatures may be drawn from the heater which will be hereinafter more fully set forth, and also maintain a higher temperature in the waste water.

Another object of my invention is to provide an apparatus of this character in which the fresh water in its passage through the tubes is caused to have rotating movement so as to cause all of the water to engage the tubes and absorb all heat possible from the waste water.

Another object of my invention is to provide simple means for the flow of water, incident to the variation, caused when the velocity is changed as will be readily understood by those skilled in the art.

A further object of my invention is to provide an apparatus of this character in which access may be had to all of the tubes so that any of them can be readily removed or replaced without removing all of the banks of tubes from the tank.

A still further object of my invention is to provide an apparatus of this character which is simple in construction, cheap to manufacture and assemble and capable of being readily set up in either square or long narrow tanks as will be hereinafter more fully set forth.

In the accompanying drawings:—

Figure 6 is an enlarged horizontal sectional view of one of the banks of tubes showing the construction of the heads and locking means for the spiral baffles in the tubes.

Figure 7 is an enlarged vertical sectional view of Figure 6 of the tubes and showing the baffles therein.

Figure 8 is a sectional view of one of the tubes taken at right angles to Figure 7.

Figure 10 is a diagrammatical view of the heater showing two washing wheels supplying waste water to the heater and showing the partly heated water being supplied to the washing wheels.

Figure 1:
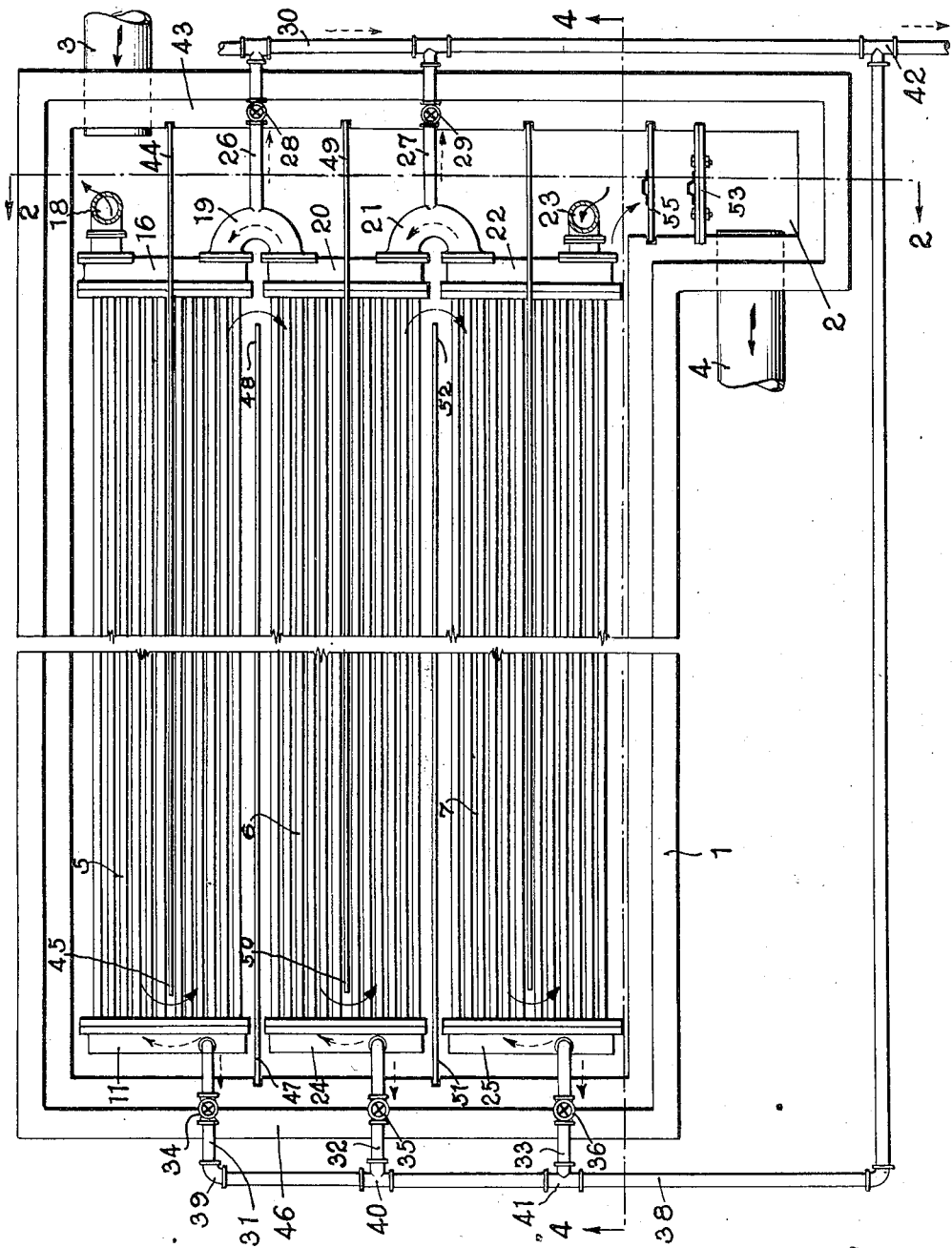
Figure 1 is a top plan view of my improved apparatus showing the pipe connections drawing off the fresh water from different banks of tubes and different portions of the banks.

In the use of my invention as applied to laundries, it has been found that the initial washing of clothes should be with water at a temperature of about ninety degrees and by the arrangement shown in Figure 1 of the drawings, I am enabled to supply the washing wheels with water at this temperature during the different seasons of the year when the temperature of the city water supply varies. During the winter, the cold fresh water enters the apparatus at about forty degrees and therefore it is necessary to carry it a greater distance through the tubes to cause it to be heated to ninety degrees than it would be in summer when the water from the city supply is around seventy degrees.

Referring now to the drawings:—

1 represents the tank which as shown is preferably of a rectangular form and having at one side the off set portion 2 communicating therewith. Arranged in one end of the tank and adjacent the side is the waste water supply pipe 3 for the tank and said waste water is caused to travel back and forth in the tank and discharged from the off set portion 2 of the tank through the pipe 4 leading to the sewer. Arranged in the tank are three banks of pipes 5, 6 and 7 and as shown these banks are arranged side by side and each bank consists of the desired number of tubes to form the bank of a given size as shown resting on the base 7' or it may be supported in any desired manner. Each bank is composed of a series of tubes 8 having their ends tightly connected to the plates 9 and 10. Connected to the plate 9 is a head 11 having the flange 12 secured thereto by bolts 13 as clearly shown in Figure 6 of the drawings. The plate 10 has connected thereto, by the flange 14 and bolts 15, a head 16 which is provided with a divisional plate 17 causing the travel of the water back and forth through two sets of pipes. The head 16 is supplied with the discharge pipe 18 leading to the storage heater. Said head has connected thereto an elbow pipe 19, which leads across and connects to the head 20 of the second bank 6 of the pipes.

By this arrangement of heads and the divisional plate 17, it will be seen that the water entering the return bend 19 from the bank 20 is caused to travel through one-half of the tubes 8 to the head 11 and from said head through the other half of the tubes to the space on the other side of the divisional plate 17 and out through the pipe 18 to the storage heater. The head 20 of the second bank 6 of the pipe is constructed exactly the same as that shown and described on Figure 6. Connected to the head 20 a return bend 21 which leads to the head 22 of the third bank of tubes 7. The head 22 has connected thereto a pipe 23 through which the water enters from the city water supply at different temperatures at different seasons of the year.

The second bank of pipes 6 is provided with a head 24 and the third bank by head 25 constructed exactly like the head 11 of the first bank 5, as shown in Figure 6 of the drawings. Connected to the return bend 19, is a pipe 26 which is connected to the pipe 30 and connected to the return bend 21, is a pipe 27 which is connected to the pipe 30. The pipes 26 and 27 are provided with valves 28 and 29. The pipe 30 leads out to the wash wheels, as will be hereinafter more fully described. Connected to the head 11, is a pipe 31 and connected to the head 24 is a pipe 32, and connected to the head 25 is a pipe 33, the pipes 31, 32, and 33 being provided with valves 34, 35 and 36 and connected at their outer ends with the pipe 38 at 39, 40 and 41, the pipe 38 being connected to the pipe 30 at 42.

Carried by the end 43 of the tank 1 is the baffle plate 44 which is cut away to straddle the head 16 of the first bank of tubes and extends down between the tubes and terminates at the point 45, a short distance from the head 11. Carried by the end 46 of the tank 1 is a baffle 47 which extends between the two banks of tubes 5 and 6 and terminates at 48, a short distance from the heads 16 and 20 of the first and second banks of tubes. The end 43 of the tank carries a baffle 49 which straddles the head 20 and extends between the tubes of the second bank of tubes. Carried by the end 46 of the tank is a baffle 51 which extends between the tubes of the second and third bank of tubes and terminates at 52, close to the heads 20 and 22 of the second and third bank of tubes.

By the arrangement of the baffles it will be seen that the waste water from the wash wheel enters the tank through the pipe 3 and takes a zig-zag course as indicated by the arrows and is discharged through pipe 4. This zig-zag travel of the water allows the fresh water in the tubes to absorb all possible heat from the waste water. It will also be seen that the discharge of the fresh water from the tubes of bank 5 takes place through discharge pipe 18 at a point close to the inlet of the hot waste water and therefore the fresh water passes from the apparatus or reclaimer at the highest possible temperature. The travel of the fresh water through the tubes is directly opposite to the travel of the waste water in its zig-zag course through the tank and which has been found to more effectively heat the fresh water.

Figure 2:
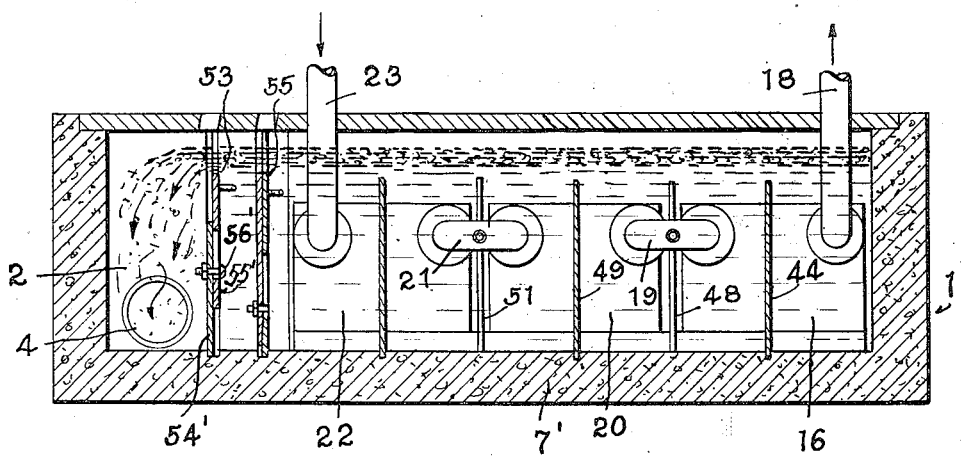
Figure 2 is a transverse sectional view taken on the line 2—2 of Figure 1 and showing the arrangement of the gates whereby the tank may be cleaned of all waste matter.
Figure 3:
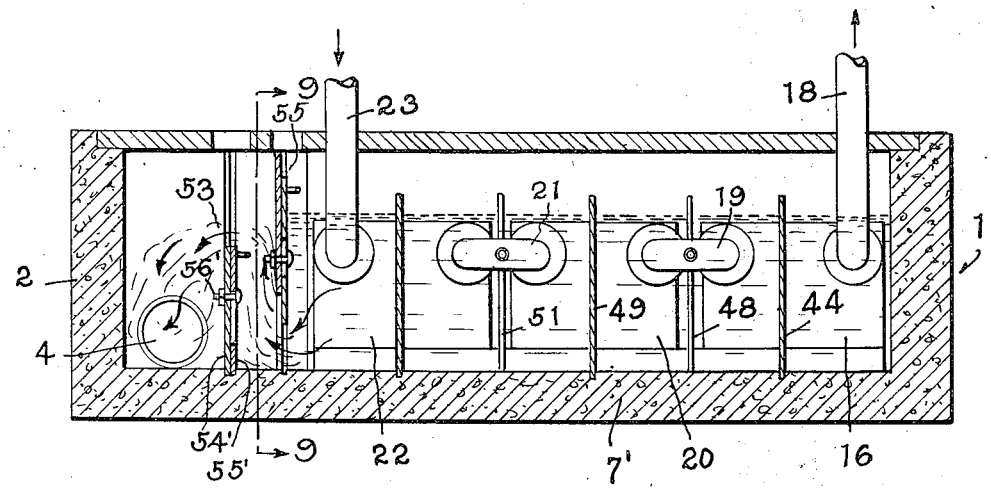
Figure 3 is a sectional view similar to Figure 2 showing the gates in their proper position during the normal operation of the apparatus.
Figure 9:
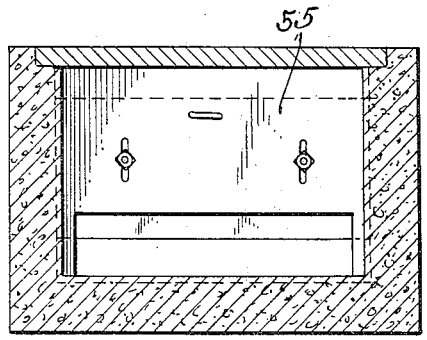
Figure 9 is an enlarged sectional view taken on the line 9—9 of Figure 3.
Figure 4:
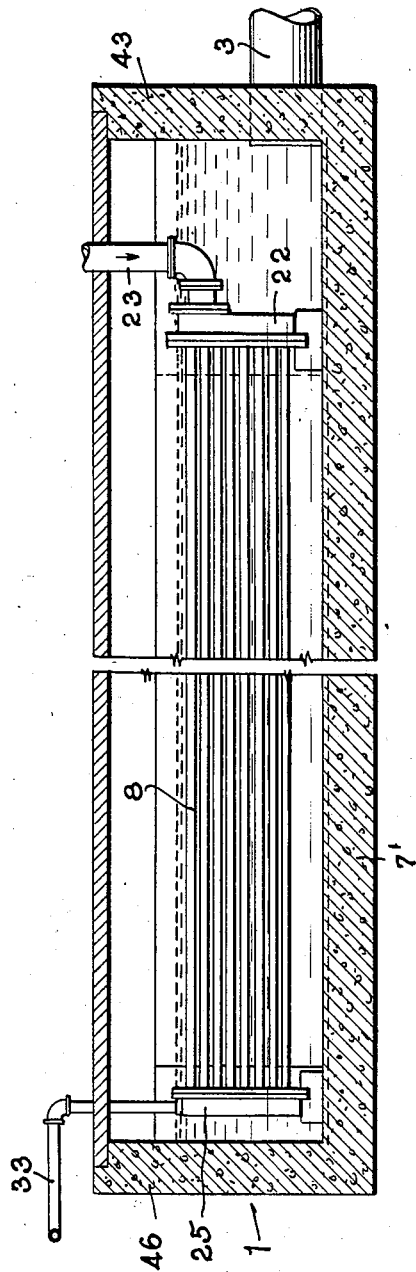
Figure 4 is a longitudinal sectional view taken on the line 4—4 of Figure 1, looking in the direction of the arrows.

The off set portion 2 of the tank is provided with the gate 53 which is made in two sections 54' and 55' bolted together by bolts 56' whereby the section 55' is moved upwardly upon the stationary section and whereby the water level is maintained in the tank and said water level can be readily changed as desired by means of the vertical operating plate 54' and 55' clearly shown in Figures 2 and 3 of the drawings. The off set portion 2 of the tank is provided with a second gate 55 which during the normal operation of the apparatus is raised in the position shown in Figures 3 and 9 of the drawings and the hot waste water from the tank flows under the same and up over the gate 53. The waste water from the washing wheels is full of grease, lint and waste material which normally floats on top so when it is desired to remove this lint and waste material the gate 55 is lowered as shown in Figure 2 and all of the surface lint and grease in the tank flows directly over the gates 53 and 55 and passes freely out of the discharge pipe 4.

The column of water, as it flows through the tube is in constant contact with the inner surface of the heating tubes by providing spiral baffles as shown in Figures 7 and 8. These baffles 56 are of a ribbon like form spirally arranged and extend out into the heads 11, 24, and 25 of the banks of tubes and have their outer ends turned over as indicated at 57, forming loops as clearly shown in Figures 7 and 8 and into which pass vertically disposed bars 59 which lock the spiral baffles against rotation in the tubes. The tubes being arranged, one directly above the other, it will be seen that a single bar locks all of the spiral baffles arranged in a vertical series. These spiral baffles engage the inner periphery of the tubes and conduct the heat to the water within the tubes.

Figure 5:
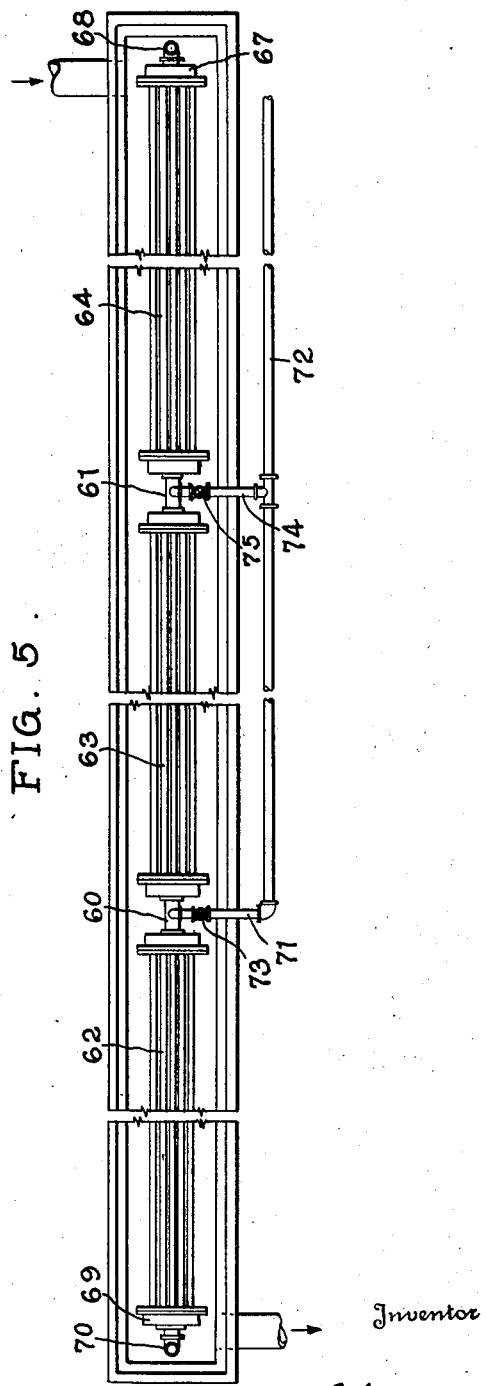
Figure 5 is a top plan view showing a series of banks of tubes of the form shown in Figure 1 and arranged end to end in a long narrow tank.

In installing this apparatus it has been found that often a laundry has not the space to arrange the banks of tubes side by side so it is necessary to arrange them end to end as shown in Figure 5 of the drawings. In such a cause, the heads of the bank are spaced a short distance apart and the pipes 60 and 61 connected to the banks 62, 63 and 64 so that the fresh water is conveyed from one bank to the other involving the same principle as shown in Figure 1 of the drawings. In such a case the head 69 of the bank 62 is provided with a fresh water inlet 70. Connected to the pipe 60, connecting the heads of the banks 62 and 63 is a pipe 71, leading outwardly and connected to the pipe 72 leading to the wash wheels and said pipe 71 is provided with a valve 73. The pipe 61 has connected thereto a pipe 74 provided with a valve 75 and said pipe has its outer end connected to the pipe 72 whereby the partly heated water may be supplied to the washing wheels for the initial washing as described in respect to Figure 1.

In operation:—

The hot water from the washing wheels is discharged to the tank through the pipe 3. The waste water takes the zig-zag course heretofore described and is discharged from the tank through the pipe 4. The fresh water is admitted to the tubes through the pipe 23 and takes the zig-zag course through the tubes and is heated and discharged from the pipe 18 and passes to the storage heater whereby the water is heated to the desired temperature used in the wash wheels. From this description it will be seen that the water gradually becomes heated and reaches the maximum at the point of discharge at 18'. As previously stated, the clothes in a laundry are initially washed in water at approximately ninety degrees which does not cause the setting of any stains, but allows the stains to be washed from the clothes. In winter the city water is approximately forty degrees and it is necessary to bring the water up to ninety degrees before it is discharged to the washing wheels. In order to obtain this temperature, all of the valves in the pipes 26, 27, 31, 32 and 33 are closed except the valve 34. This allows the water to pass from the second bank of tubes 5 to the pipe 38 and to the washing wheels at approximately ninety degrees. In the springtime, when the temperature of the city water runs around fifty-five degrees, it is not necessary to pass the water through all of the second bank of tubes 6 as it does not require as much heat to bring the water up to ninety degrees. At this season, all of the valves would be closed except the valve 35 which allows the water at approximately ninety degrees to pass from the head 24 of the second bank of tubes out through the pipe 38 to the pipe 30 and thence to the washing wheels. In the summertime when the temperature of the city water supply is approximately seventy degrees, all the valves would be closed except the valve 36 and the water would be drawn from the head 25 through the pipe 33 to the pipe 38 at a temperature approximately ninety degrees. By having the other connections with the other heads and valves it will be seen that water can be drawn off from the banks after a greater or less travel through the banks of tubes, so that the temperature can be varied or regulated to draw water from the banks at approximately ninety degrees. This is necessary in different climates where the temperature of the water varies during the year and also allows for large range of temperatures of the water supply in different sections of the country.

While I have shown and described the specific arrangement of parts, it will be understood that the same could be varied without departing from my invention.

In the diagrammatical view shown in Figure 10, I have shown the three wash wheels 74, 75 and 76 connected to the pipe 30 by means of the pipes 77, 78 and 79. These pipes are provided with valves 80, 81 and 82 whereby the water may be supplied to any one of the wheels. The inlet pipe 3 of the heater is connected to the wash wheels.

Having thus fully described my invention, what I claim is:—

1. An apparatus of the character described comprising a tank, a series of connected heaters therein, a water supply for the heaters adjacent one side of the tank, a discharge for the heaters at the opposite side of the tank, a passage communicating with the tank and having a water discharge, a water supply for the opposite side of the tank, an adjustable gate in said passage for maintaining a predetermined water level in the tank, a second gate in the passage between the first gate and the tank and vertically adjustable means to cause water to flow directly over the two gates and into the discharge pipe connected to the passage.

2. A heater comprising a plurality of banks of tubes, a pair of headers mounted on the opposite ends of each bank of tubes, with the headers at one end of the banks divided, return bends connecting the adjacent sides of the headers of adjacent banks to provide a circuitous and continuous circuit through all of the tubes of all of the banks, draw-off pipes connected to the return bends and having independent control valves therein, other draw-off pipes connected to the headers at the opposite ends of the banks and having controlling valves therein, said tubes adapted to receive water in circulation therethrough, and means for circulating water exteriorly about the tubes to effect heat exchange between the water within and the water surrounding the tubes, said draw-off pipes adapted for independent operation to take off water at different temperatures from the headers and return bends.

3. A heater comprising a bank of tubes, headers connected to the opposite ends of the bank of tubes, a spiral ribbon baffle disposed in each tube and projecting at opposite ends into the headers, and locking bars in the headers extending across the ends of alined tubes, the projecting ends of the ribbon baffles being overturned and detachably engaging about the edges of locking bars to hold the ribbon baffles in taut and twisted position.

ALLAN T. SHEPHERD.